(No Model.) 2 Sheets—Sheet 1.

H. C. BAXTER & H. R. STICKNEY, 2d.
MACHINE FOR FILLING CANS.

No. 284,998. Patented Sept. 18, 1883.

Witnesses:
Henry S. Payson
Daniel Brooks

Inventors.
Hartley C. Baxter,
Henry R. Stickney, 2d,
by Franklin C. Payson,
their Attorney (No Model.) 2 Sheets—Sheet 2.
H. C. BAXTER & H. R. STICKNEY, 2d.
MACHINE FOR FILLING CANS.
No. 284,998. Patented Sept. 18, 1883.
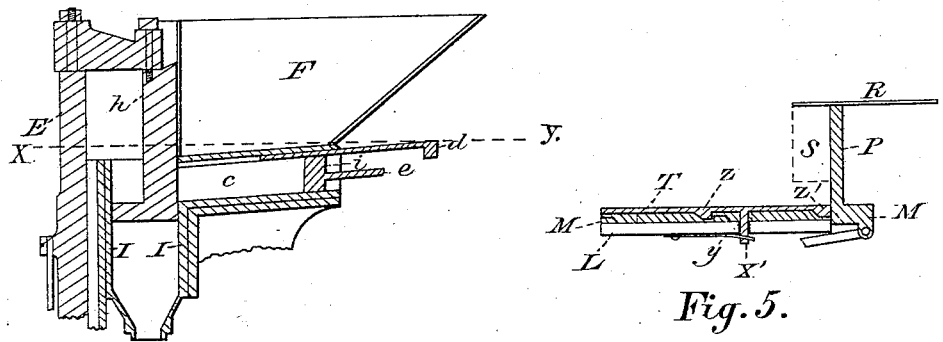
Fig. 3.
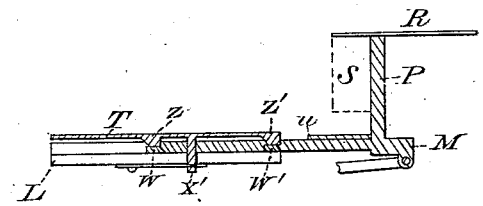
Fig. 5.
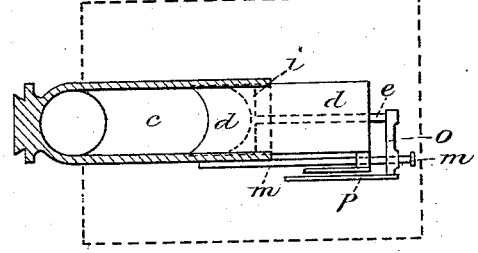
Fig. 4.
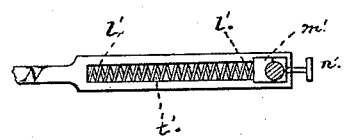
Fig. 6.
Fig. 7.
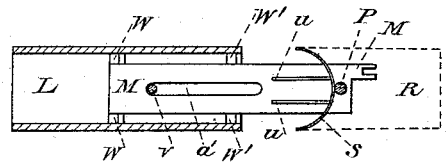
Fig. 8.
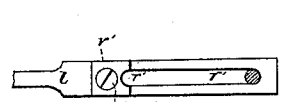
Fig. 9.
Witnesses:
Henry S. Payson
Daniel Brooks
Inventor.
Hartley C. Baxter
Henry R. Stickney, 2d,
by Franklin C. Payson
Their Attorney.
N. PETERS. Photo-Lithographer, Washington, D. C.

UNITED STATES PATENT OFFICE.

HARTLEY C. BAXTER AND HENRY R. STICKNEY, 2D, OF PORTLAND, MAINE.

MACHINE FOR FILLING CANS.

SPECIFICATION forming part of Letters Patent No. 284,998, dated September 18, 1883.

Application filed May 5, 1883. (No model.)

*To all whom it may concern:*

Be it known that we, HARTLEY C. BAXTER and HENRY R. STICKNEY, 2d, both of Portland, in the county of Cumberland and State of Maine, have invented certain new and useful Improvements in Machines for Filling Cans; and we do hereby declare that the following is a full, clear, and exact description of the invention, that will enable others skilled in the art to which it appertains to make and use the same, reference being had to the accompanying drawings, forming a part of this specification, in which—

Figure 1:
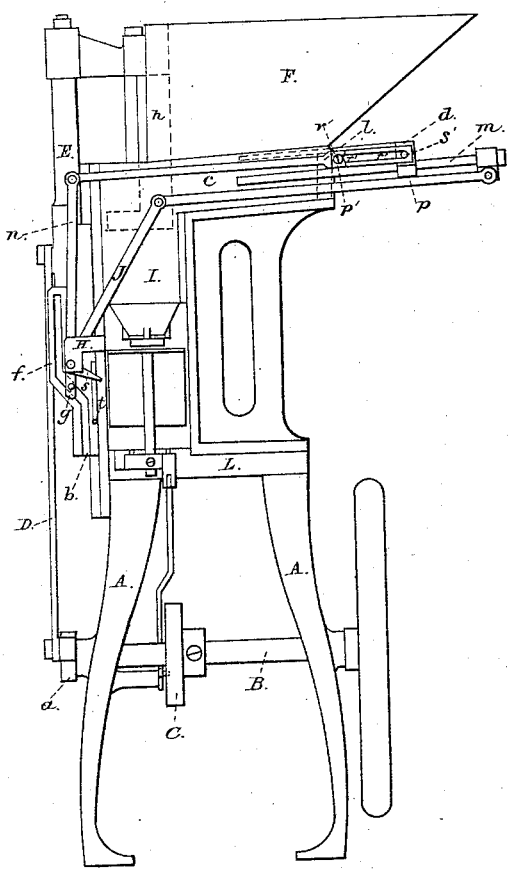
Figure 2:
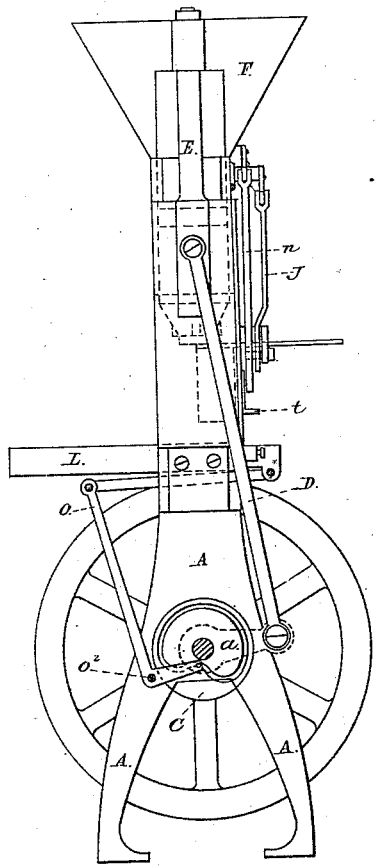

Figure 1 is a front elevation. Fig. 2 is an end view, part of the frame being broken out. Fig. 3 is a vertical section through the hopper and plunger. Fig. 4 is a transverse section through the line $x\,y$ of Fig. 3. Fig. 5 is a vertical section of the slide upon which the cans are carried under the plunger. Fig. 6 is the same, showing the plate raised, as during the filling of a can. Fig. 7 is a detail of arm N, showing a method of constructing same. Fig. 8 is a detail showing a top plan of the table L and the slide M. Fig. 9 is a detail of device in arm $l$ for measuring different quantities of corn.

Our invention relates to the process of packing green corn and other vegetables in cans. Heretofore the cans have been filled by hand-presses in such a manner that the quantity forced into different cans has been variable; or by machines which have been constructed with a view to measuring the quantity of corn to be discharged, but which, after the measurement is completed, compress the corn to a greater or less extent, according as it is very green or dry and hard.

It is the purpose of our invention to remedy this defect by providing a machine which will accurately measure the corn or other vegetables desired, and force the same into cans without changing the same by so doing. The hand-presses and machines heretofore used have but one plunger. In our machine are two plungers, and the corn falls by its own weight, or is simply brushed into a receptacle, the supply to which is cut off at the proper moment by a sliding device, and in such a manner that the corn will not be compressed before measurement is complete.

A A is the frame of the machine, and B the main shaft. To this shaft is attached the crank $a$, to the end of which is pivoted the rod D, the upper end of which is pivoted to the rod E. Fixed to the rod E, at the side, is a plate, $f$, which, together with the rod E, is placed in proper guides, which allow them a vertical movement. Within the plate $f$ is the groove $b$, which has the direction seen in Fig. 1.

Connected by a shoulder with the rod E is the plunger $h$, the lower end of which plays within the barrel I. (See Figs. 1 and 3.) This barrel, like that in all machines in common use, contracts in size toward the bottom, terminating in a circular opening called the "nozzle," but differs from all others in that the nozzle is adjustable, and may be arranged to fit into cans with openings of any and different diameters. This is accomplished by having around the bottom of the barrel a thread, upon which may be screwed nozzles having mouths of the desired size.

At the upper part of the machine, Figs. 1, 2, and 3, is the hopper F, which may be of any convenient size or shape.

Beneath the hopper F, is the rectangular box $c$, which may be of any convenient size and shape, or may be constructed with movable sides and bottom. This box should slightly incline toward the barrel I, in order that the juices of the corn or other vegetables which may leak through the hopper may run into the barrel, and thus prevent possible waste. The box $c$ is alternately connected with and entirely cut off from the hopper F by the slide $d$, and said box, being wide and shoal, will be readily filled from the hopper F when the slide $d$ is open, and when the slide $d$ is closed a fixed quantity of corn is inclosed in the box $c$, and is in an uncompressed state. The parts of our machine are so arranged that the inner or left end of the box $c$ is closed by the plunger $h$ when said box is open to the hopper F, thus making it impossible for corn to fall from the hopper into the barrel I, and when the slide $d$ is closed the plunger $h$ is raised, and communication effected between the barrel I and box $c$. The inner end of the slide $d$ and box $c$ should be of a shape to conform to the plunger $h$. (See Fig. 4.)

Fixed to the side of the box $c$ is a rod, $m$, upon which runs a ring, which is attached to the slide $d$. Pivoted to the outside of this ring is a rod, $l$, which is pivoted to the arm $n$, to the lower end of which is attached the pin $g$, which plays in the groove $b$. (See Figs. 1 and 4.)

Moving freely within the box $c$, beneath the slide $d$, is a plunger, $i$, having a rod, $e$, Fig. 3. The end of this rod $e$ is secured to a yoke, $o$, which plays upon the rod $m$. The other end of the yoke (see Fig. 4) has pivoted to it the rod $p$, which, at the other end, is pivoted to the arm $J$, the lower end of which is pivoted to the frame of the machine. At the end of the arm $J$ is an elbow, $s$, which engages the pin $t$ on the frame $f$, Figs. 1 and 2. The pin $t$, like the groove $b$, is on the movable plate $f$.

For measuring the corn in different desired quantities several devices may be used, one of which is shown in Figs. 1 and 9. In the arm $l$ is a slot, $r'$ $r'$, on which is a slide or gage, $v'$. This slide can be fixed at any point in the slot by means of the bolt $p'$, or any other device suitable for fastening the same. When the slide $v'$ is in the slot $r'$ $r'$ in the position shown in Fig. 1, the arm $l$ in its backward motion does not move either the slide $d$ or plunger $i$ until said arm has moved backward sufficiently to bring the slide $v'$ against the pivot $s'$, which is attached to the ring playing on the rod $m$. By moving the slide $v'$ from its position, as shown in Fig. 9, toward the right-hand end or back of the slot $r'$ $r'$, we impart a greater backward motion to the slide $d$ and plunger $i$, which increases the length of the box $c$, and consequently gives a larger measure of corn to be carried into the barrel I on the forward motion of the plunger $i$. By moving the slide $v'$ toward the left-hand end of the slot $r'$ $r'$, the quantity of corn will be diminished for the same reason. The slot $r'$ $r'$ may be marked at proper distances, in order to indicate where the gage $v'$ should be in order to measure any particular quantity of corn. The same result may be obtained if the sides or bottom of the box $c$, or both, are movable. In order to avoid joints, and thereby prevent leakage, it is preferable that the device should be as described.

Directly beneath the barrel I is a stationary table or platform, L, having elevated sides, within which, upon the surface of the table, slides the piece M. This piece or slide M has pivoted to it, at the end, the rod N, (see Figs. 2 and 6,) which is constructed, at the end where it joins the piece M, with slot, spring, and set-screw, as shown in Fig. 7. This rod N is pivoted, at the other end, to the arm O, which in turn is pivoted to the arm of the machine at $O^2$. (See Fig. 2.) At $O^2$ the arm O turns at a right angle, and at its termination is a pin, which plays in a slot in the path-cam C. Upon the upper surface of this slide M are the two guides $u$ $u$ (see Fig. 8) and the standard P, having the curved piece S, and upon the upper end of the latter the plate R, Fig. 6. At the center of the width of the slide M is an elongated slot, $a'$, (see Fig. 8,) which is concentric with a circular aperture, $v$, in the table L. At each side of the slide M are two projections, W W', (see Fig. 6,) which are vertical on the side farthest from the standard P, but are beveled upon the side nearer the standard. (See Figs. 5 and 6.)

Between the elevated sides of the table and covering the slide M is a plate, T, having at the center of its width the pin X', which passes through the aperture $v$ in the table L, and is connected with the spring $y$, which is secured to the under side of the table L. Upon the under side of the plate T, and at the same distance apart as the projections W W', are the projections Z Z'. These projections present perpendicular faces toward the standard P, but are beveled upon the opposite side. The plate T has also slots to receive the guides $u$ $u$.

The operation of the machine is as follows: Suppose the machine in the position shown in Fig. 1, and that the plate $f$, rod E, and plunger $h$ are moving downward. The pin $g$, as it slides through the slot $b$, carries the arms $n$ and $l$ backward. The slot $r'$ $r'$ now slides past the pin $s'$ until said pin encounters the gage $v'$, without imparting any motion to either the slide $d$ or plunger $i$; but when the pin $s'$ impinges on the gage $v'$ both the slide $d$ and plunger $i$ are carried backward a greater or less distance, according to the position of the adjustable gage $v'$ in the slot $r'$ $r'$. Corn now drops or is brushed from the hopper F into the box $c$, filling the open part of said box. Cans are supplied to the machine, with the opening upward, through a vertical spout, such as has been in common use among packers. Said spout is supposed to be directly over the guides $u$ $u$, (see Fig. 6,) on which a can is supposed to be resting. Said can is carried by slide M (moved by the path-cam C and arms O and N, see Fig. 2) under the mouth or nozzle of the barrel I. When it ceases to advance, W W' have passed beyond Z Z', and the slide M and plate T have the position shown in Fig. 5. Meanwhile the other parts of the machine have operated in the following manner: The upward motion of rod E and plunger $h$ causes pin $g$ to pass through groove $b$, moves arms $n$ and $l$ forward, closes slide $d$, separating the corn that has fallen into box $c$ from that in hopper F, plunger $h$ rises and leaves opening between box $c$ and barrel I, pin $t$ comes in contact with arm $s$, which moves arms J $p$, driving what corn is inclosed in box $c$ into barrel I, and the corn is ready to be pressed into can beneath by downward motion of plunger $h$, as follows: Slide M takes position shown in Fig. 6, plate T being raised by the meeting of W and W' with Z and Z', and the hole in the top of the can passes over the nozzle on the end of the barrel I, (see Fig. 3,) another can falling from the spout or can-supply on the guides $u$. The rod E and plunger $h$ now descend, forcing into the can beneath what corn has been discharged into barrel I. As before, slide $d$ opens, a quantity of corn is dropped in box c, and on the upward stroke of plunger h slide d closes, plate T drops, freeing first can from nozzle of barrel, while second can is pushed beneath nozzle, same as first, and at same time delivers the first can on a table attached to the machine.

When it is desired to fill cans of smaller sizes by means of the screw n', operating on the spring t' in the arm N, the action of the arm N may be shortened more or less, according to the size of the can to be filled, so that the opening of the can in every case should be carried directly under the nozzle of the barrel I by the action of the arms N O in path-cam C.

In case a can for any reason, however, should not be thrown directly under the nozzle of the barrel I, the can is prevented from being crushed by the action of the spring t' in slot l' l' upon the slide M. As the can strikes against the nozzle of the barrel I, the compression of the spring t' prevents the slide M from raising the plate T on which the can is resting, and thus gives opportunity to stop the machine and remove the can undamaged.

What we claim as our invention, and desire to secure by Letters Patent, is—

1. The combination of the hopper F, the box c, slide d, and plunger i, as described.

2. The combination of the hopper F, box c, slide d, plunger i, rod e, arms p and J, and pin t, as and for the purposes set forth.

3. The combination of the hopper F, the box c, slide d, plunger i, and upright barrel I, substantially as described.

4. The combination of the hopper F, box c, slide d, plunger i, rod e, arms p and J, arms l and n, plate f, with groove b, pin t, and arm s, as and for the purposes set forth.

5. In combination with the box c, the upright barrel I and plunger h, as and for the purposes set forth.

6. The combination of the box c, upright barrel I, plunger h, arm D, arm a, and shaft B, substantially as described.

7. The combination of the barrel I, table L, slide M, with guides u u, plate T, substantially as described, with spring y, pin X', rod N, arm O, cam C, and shaft B, as set forth.

8. The combination of the barrel I, table L, slide M, with guides u u, plate T, piece S, spring y, pin x', rod N, arm O, cam C, and shaft B, substantially as described.

9. The combination of the arm l, slot r' r', gage v', and pin s', as and for the purposes set forth.

10. The combination of the arm l, slot r' r', gage v', and pin s', with the slide d, as described.

11. The combination of the arm l, slot r' r', gage v', and pin s', with slide d, hopper F, and box c, substantially as described.

12. The combination of the slide M, having piece S, with the arms N and O, slot l' l', spring t, box m', and screw n', substantially as described, for the purposes set forth.

In testimony that we claim the foregoing we have hereunto set our hands this 30th day of April, 1883.

HARTLEY C. BAXTER.
HENRY R. STICKNEY, 2D.

Witnesses:
HENRY S. PAYSON,
DANIEL BROOKS.